(12) United States Patent
De Graaf et al.

(10) Patent No.: US 11,325,333 B2
(45) Date of Patent: May 10, 2022

(54) TIRE BUILDING DRUM AND METHOD FOR TIRE BUILDING

(71) Applicant: VMI HOLLAND B.V., Epe (NL)

(72) Inventors: Martin De Graaf, Epe (NL); Dave Papot, Epe (NL)

(73) Assignee: VMI HOLLAND B.V.

( * ) Notice: Subject to any disclaimer, the term of this patent is extended or adjusted under 35 U.S.C. 154(b) by 0 days.

(21) Appl. No.: 17/279,521

(22) PCT Filed: Sep. 23, 2019

(86) PCT No.: PCT/NL2019/050634
§ 371 (c)(1),
(2) Date: Mar. 24, 2021

(87) PCT Pub. No.: WO2020/080933
PCT Pub. Date: Apr. 23, 2020

(65) Prior Publication Data
US 2021/0339492 A1    Nov. 4, 2021

(30) Foreign Application Priority Data

Oct. 19, 2018  (NL) .................................... 2021843

(51) Int. Cl.
*B29D 30/24*   (2006.01)
*B29D 30/26*   (2006.01)

(52) U.S. Cl.
CPC ........... *B29D 30/245* (2013.01); *B29D 30/26* (2013.01); *B29D 2030/2685* (2013.01)

(58) Field of Classification Search
CPC .... B29D 2030/2635; B29D 2030/2614; B29D 30/245; B29D 30/26; B29D 30/36; B29D 2030/2657; B29D 2030/265
(Continued)

(56) References Cited

U.S. PATENT DOCUMENTS

| 3,645,818 A | 2/1972 | Frazier ........................... 156/128 |
| 3,868,203 A * | 2/1975 | Turk .................. B29D 30/0645 |
| | | 425/543 |

(Continued)

FOREIGN PATENT DOCUMENTS

| CN | 103260863 | 8/2013 | ............. B29D 30/24 |
| CN | 103587134 | 2/2014 | ............. B29D 30/24 |

(Continued)

OTHER PUBLICATIONS

Decision to Grant issued in Japanese Patent Appln. Serial No. 2020-523728, dated Oct. 6, 2021, with English translation, 5 pages.

(Continued)

*Primary Examiner* — Robert C Dye
*Assistant Examiner* — Alexander D Booth
(74) *Attorney, Agent, or Firm* — Hayes Soloway P.C.

(57) ABSTRACT

Disclosed is a tire building drum and a method for building a tire, wherein the tire building drum includes a crown section and a bead-lock section, wherein the bead-lock section defines a bead-lock position, wherein the crown section includes crown segments movable with respect to the base from a crown-down position into a crown-up position in a crown-up direction, wherein the crown segments together form a crown surface, a leading edge and a shoulder, wherein the tire building drum further includes a sleeve that extends around the crown segments in the circumferential direction, wherein the sleeve includes a first circumferential edge that is fixed to the crown segments at a side of the shoulder facing away from the bead-lock section, a second circumferential edge that is located between the shoulder and the bead-lock position, wherein the second circumferential edge is unfixed at least when the crown segments are in the crown-down position.

15 Claims, 5 Drawing Sheets

(58) Field of Classification Search
USPC .................................................. 156/414, 417
See application file for complete search history.

(56) References Cited

U.S. PATENT DOCUMENTS

| | | | | |
|---|---|---|---|---|
| 4,149,927 | A | 4/1979 | Lauer, Jr. ...................... | 156/415 |
| 5,269,870 | A | 12/1993 | Mori ...................... | B26D 30/24 |
| 7,287,568 | B2 | 10/2007 | Roedseth et al. ............. | 156/415 |
| 8,689,848 | B2* | 4/2014 | Painter ................. | B29D 30/245 |
| | | | | 156/398 |
| 8,770,251 | B2 | 7/2014 | De Graaf et al. ............ | 156/402 |
| 10,259,181 | B2 | 4/2019 | Weaver et al. ...... | B29D 30/245 |
| 10,766,217 | B2 | 9/2020 | Marchini et al. ...... | B29D 30/24 |
| 2010/0122775 | A1 | 5/2010 | De Graaf et al. ..... | B29D 30/24 |
| 2012/0111480 | A1 | 5/2012 | Baldoni et al. ............ | 156/110.1 |
| 2014/0048212 | A1 | 2/2014 | Weaver et al. ............... | 156/415 |
| 2018/0207894 | A1 | 7/2018 | Doppenberg et al. . | B29D 30/32 |
| 2021/0339492 | A1 | 11/2021 | De Graaf et al. ... | B29D 30/245 |

FOREIGN PATENT DOCUMENTS

| | | | | |
|---|---|---|---|---|
| CN | 211334675 | | 8/2020 | ............ B29D 30/24 |
| EP | 1283114 | | 2/2003 | ............... B60C 9/07 |
| EP | 3 037 249 | | 6/2016 | ............ B29D 30/24 |
| JP | 2006-175874 | | 7/2006 | ............ B29D 30/24 |
| JP | 2012-520188 | | 9/2012 | ............ B29D 30/32 |
| JP | 2017-529257 | | 10/2017 | ............ B29D 30/32 |
| WO | WO 2009/128103 | | 10/2009 | ............ B29D 30/20 |
| WO | WO 2018/111091 | | 6/2018 | ............ B29D 30/24 |

OTHER PUBLICATIONS

Search Report issued in Netherlands Patent Serial No. NL 2021843, dated Jun. 7, 2019, 9 pages.
International Search Report and Written Opinion issued in PCT/NL2019/050634, dated Feb. 27, 2020, 10 pages.
Chinese Official Action issued in related Chinese Patent Application Serial No. 201910992360.7, dated Dec. 31, 2021, 10 pages.
Reason for Refusal issued in Japanese Patent Appln. Serial No. 2020-053728, dated Apr. 15, 2021, with English translation, 5 pages.
Decision to Grant issued in Japanese Patent Appln. Serial No. 2020-053728, dated Oct. 6, 2021, with English translation, 5 pages.

* cited by examiner

TIRE BUILDING DRUM AND METHOD FOR TIRE BUILDING

BACKGROUND

The invention relates to a tire building drum, in particular a crown drum, and a method for tire building.

A known tire building drum comprises a center section with a center sleeve that extends completely over the center section from one end of the center section to the opposite end of the center section in the axial direction. Both ends of the center sleeve are fixed at the respective ends of the center section. Hence, the center sleeve is repeatedly subjected to axial tension during the operation of the tire building drum, which substantially reduces the lifetime of said center sleeve.

US 2014/0048212 A1 discloses a tire building drum that does not have a center sleeve, nor a sleeve or any type of rubber component that extends from one end of the center section to the other end, nor a sleeve that is located in the center of the center section of the drum. Instead, the known tire building drum comprises first and second shoulder seals which are located on the axially outer ends of the segments forming the center section. Each shoulder seal has a first end which is secured in seal clamps located adjacent the center section segments. The shoulder seals each further comprise a second end that is a free or unconstrained end. Thus the shoulder seals are not subject to axial tension which substantially reduced the life of the center sleeve. The free end rests on the outer surface of the center segments and will slide relative to the center segments when the drum is radially expanded.

SUMMARY OF THE INVENTION

A disadvantage of the tire building drum as disclosed in US 2014/0048212 A1 is that when the free or unconstrained end of the shoulder seal slides over the center segments, it also slides relative to the tire components supported on said center segments. This may at least partially deform or displace the tire components at said shoulder seal. Moreover, as the free or unconstrained end of the shoulder seal slides over the center segment, it at least partially exposes the surface of said center segment that was previously covered by the shoulder seal. As shown in US 2014/0048212 A1, said surface comprises a step to accommodate the shoulder seal in a flush orientation relative to the rest of center segment. If the center segments are radially expanded, the tire components are supported directly on said stepped surface, which could leave imprints in the tire components or makes stitching difficult because of the uneven surface.

It is an object of the present invention to provide a tire building drum and a method for tire building, wherein a crown-up of the tire components can be improved.

According to a first aspect, the invention provides a tire building drum that is rotatable about a central axis extending in an axial direction, wherein the tire building drum comprises a crown section and a bead-lock section adjacent to the crown section in the axial direction, wherein the bead-lock section defines a bead-lock position for engaging a bead of a tire, wherein the crown section comprises a plurality of crown segments distributed in a circumferential direction about the central axis and movable with respect to the central axis from a crown-down position into a crown-up position in a crown-up direction with at least a vector-component in a radial direction perpendicular to the central axis, wherein the crown segments together form a crown surface facing outwards in the radial direction, a leading edge facing towards the bead-lock section in the axial direction when the crown segments are in the crown-down position and a shoulder that defines the transition from the crown surface to the leading edge, wherein the tire building drum further comprises a sleeve that extends around the plurality of crown segments in the circumferential direction, wherein the sleeve comprises a first circumferential edge that is fixed to the plurality of crown segments at a side of the shoulder facing away from the bead-lock section and a second circumferential edge that is located between the shoulder and the bead-lock position when said plurality of crown segments are in the crown-down position, wherein the second circumferential edge is unfixed at least when the plurality of crown segments are in the crown-down position.

The unfixed, free or unconstrained second circumferential edge can be moved freely in response to at least the initial movement of said plurality of crown segments from the crown-down position into the crown-up position while the first circumferential edge is fixated in a fixed position on the crown segments. The first circumferential edge of the sleeve can thus remain in place on the crown segments regardless of the crown-up. Thus, the exposure of the crown segments to direct contact with the tire components does not change during the crown-up.

In a preferred embodiment the bead-lock section comprises a plurality of bead-lock segments which are movable in the radial direction for engaging the bead at the bead-lock position, wherein the second circumferential edge is located between the shoulder and the bead-lock segments when said plurality of crown segments are in the crown-down position. By positioning the second circumferential edge to the side of the bead-lock segments, it can be prevented that the second circumferential edge is locked-in and/or retained to said bead-lock segments during the engagement of the bead.

In a further embodiment the sleeve comprises a sleeve body extending between the first circumferential edge and the second circumferential edge, wherein the sleeve body comprises a first section that defines the first circumferential edge and that is supported on the plurality of crown segments in both the crown-down position and the crown-up position, wherein the sleeve body further comprises a second section extending between the first section and the second circumferential edge, wherein the second section is unsupported with respect to the plurality of crown segments in the crown-down position and at least partially supported by the shoulder in the crown-up position. The second section can therefore initially be supported in an orientation spaced apart from the shoulder, i.e. not resting on the shoulder. Said position may for example be a position in which the sleeve at least partially spans any gaps between said shoulder and other parts of the tire building drum, i.e. to provide a flat or substantially flat surface for the application and/or stitching of the tire components.

In an embodiment thereof the tire building drum comprises an intermediate member between the crown section and the bead-lock section, wherein the second circumferential edge is supported on said intermediate member when the plurality of crown segments are in the crown-down position. The intermediate member can support the second section in an orientation in which said second section is at least partially spaced apart from the shoulder, i.e. to provide the aforementioned flat or substantially flat application surface for the tire components.

In a further embodiment thereof the second section is at least partially supported on said intermediate member when the plurality of crown segments are in the crown-down position. By also supporting a part of the second section, slacking of the sleeve between the crown segments and the intermediate member can be prevented.

In a further embodiment thereof the crown surface extends at a crown-down radius when the plurality of crown segments are in the crown-down position, wherein the intermediate member is arranged for supporting the second circumferential edge at the crown-down radius. The second section can thus be supported in a substantially level and/or axial orientation.

In a further embodiment thereof the second section is arranged to be supported on the shoulder at least up to the leading edge. The part of the shoulder up to the leading edge defines the shape of the tire components during the crown-up of the crown segments. Hence, the sleeve extends at least up to the position where said shoulder shapes the tire components.

In a further embodiment thereof the sleeve body extends in a longitudinal direction from the first circumferential edge to the second circumferential edge, wherein the sleeve further comprises a retaining element in the second section which is disengaged from the plurality of crown segments when said crown segments are in the crown-down position and which is arranged to engage and retain the sleeve to the plurality of crown segments in the longitudinal direction of the sleeve body when said crown segments are in the crown-up position. The sleeve tends to contract in the longitudinal direction when the diameter of the crown section is expanded. Ideally, the length of the sleeve is kept constant. By providing a retaining element in the second section, preferably at or near the second circumferential edge, the second circumferential edge remains unfixed with respect to the crown segment, at least during the initial movement of the crown segments from the crown-down position towards the crown-up position, so that the second section may be supported independently from the crown segments. Meanwhile, the sleeve can be retained to the crown segments in the longitudinal direction when the crown segments move into the crown-up position. Hence, contraction of the sleeve in the longitudinal direction, especially towards the crown-up position, can be prevented. Note that even when the retaining element engages the crown segments, the second circumferential edge can still be considered unfixed, as the retaining element can be automatically disengaged from the crown segments when the crown segments move back towards the crown-down position.

Preferably, the retaining element is a protrusion, wherein the plurality of crown segments each comprise a recess for receiving said protrusion when the plurality of crown segments are in the crown-up position. Hence, the retaining element can engage and disengage the recess in response to the movement of the crown segments between the crown-down position and the crown-up position through a simple form fit.

In another embodiment the entire sleeve body except for the first circumferential edge is unfixed with respect to the plurality of crown segments. Hence, the entire sleeve body is free to move relative to the crown segments in response to the crown-up, except for the first circumferential edge.

In another embodiment the first circumferential edge is fixed to the plurality of crown segments at the crown surface. The connection can thus be made in said crown surface. The crown surface may be stepped to recess the sleeve so that the sleeve is flush or substantially flush with the rest of the crown segment outside of the sleeve.

According to a second aspect, the invention provides a method for tire building with the use of the tire building drum according to any one of the aforementioned embodiments, wherein the method comprises the steps of:
moving the plurality of crown segments into the crown-down position to receive one or more plies onto the sleeve at the crown section and a bead onto the bead-lock section at the bead-lock position;
engaging the bead with the bead-lock section at the bead-lock position; and
moving the plurality of crown segments from the crown-down position into the crown-up position to shape the one or more plies;
wherein the second circumferential edge is allowed to move freely with respect to the plurality of crown segments in response to the movement of said plurality of crown segments from the crown-down position into the crown-up position.

The method relates to the practical implementation of the tire building drum. Hence, the method and its embodiments have the same technical advantages, which will not be repeated hereafter.

In a preferred embodiment of the method the sleeve comprises a sleeve body extending between the first circumferential edge and the second circumferential edge, wherein the sleeve body comprises a first section that defines the first circumferential edge and that is supported on the plurality of crown segments in both the crown-down position and the crown-up position, wherein the sleeve body further comprises a second section extending between the first section and the second circumferential edge, wherein the method comprises the step of leaving the second section unsupported with respect to the plurality of crown segments in the crown-down position, while the second section is at least partially supported by the shoulder in the crown-up position.

In an embodiment thereof the crown surface extends at a crown-down radius when the plurality of crown segments are in the crown-down position, wherein the method comprises the step of supporting the second circumferential edge at the crown-down radius when the plurality of crown segments are in the crown-down position.

In a further embodiment of the method the sleeve body extends in a longitudinal direction from the first circumferential edge to the second circumferential edge, wherein the sleeve further comprises a retaining element in the second section which is disengaged from the plurality of crown segments when said crown segments are in the crown-down position and which retains the sleeve to the plurality of crown segments in the longitudinal direction of the sleeve body when said crown segments are in the crown-up position.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
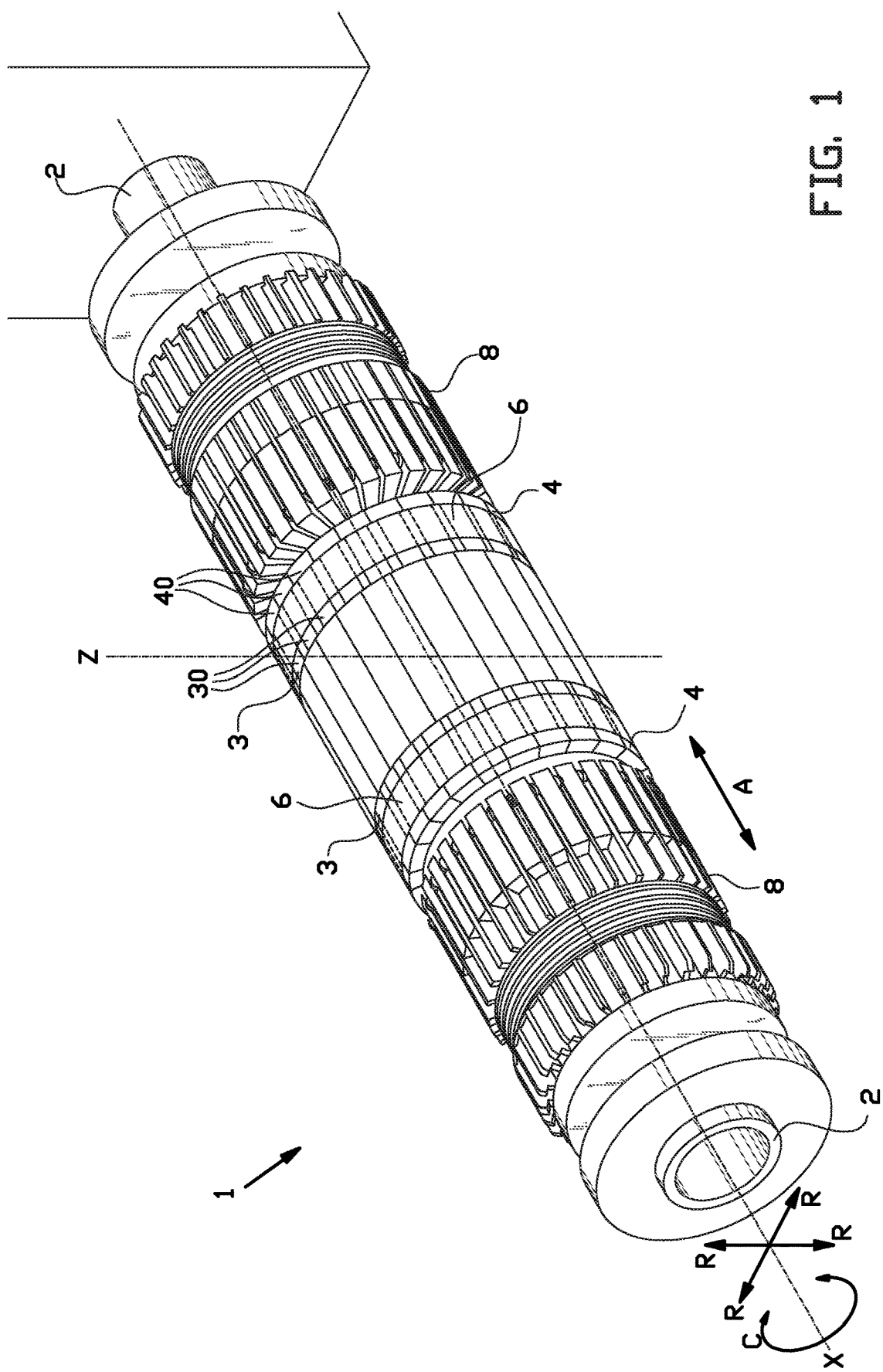
FIG. 1 shows a tire building drum according to a first embodiment of the invention, comprising a crown section with a plurality of crown segments in a crown-down position and a sleeve supported on said crown segments.

FIG. 1 shows a tire building drum 1, in particular a crown drum, according to an exemplary first embodiment of the invention.

Figure 2:
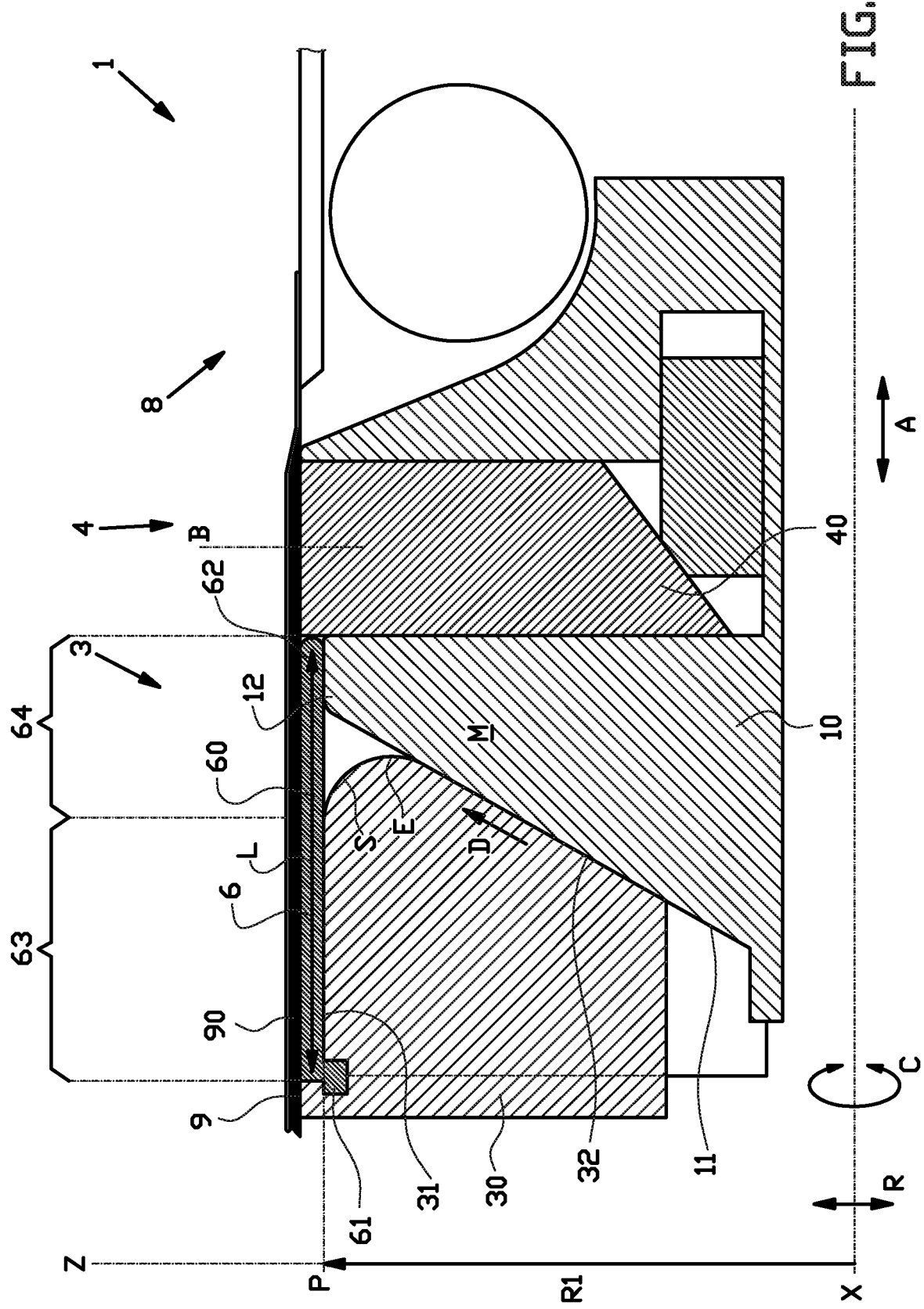
FIG. 2 shows a partial cross section of the tire building drum according to FIG. 1.
Figure 3:
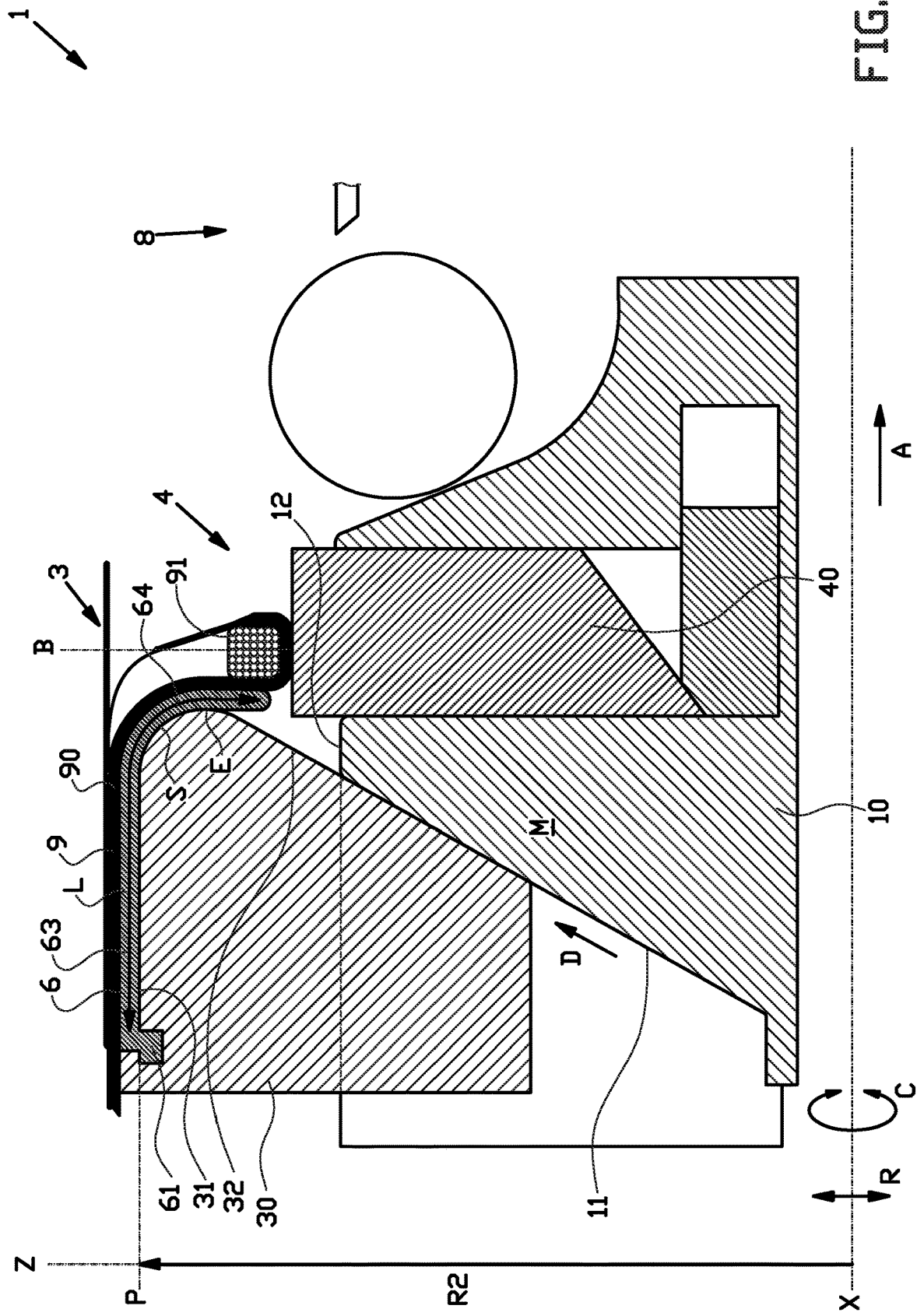
FIG. 3 shows a partial cross section of the tire building drum according to FIG. 2, with the plurality of crown segments in a crown-up position.

The tire building drum 1 comprises two drum halves which are rotatable mounted to a drum shaft 2 on opposite sides of a center Z of the tire building drum 1. The tire building drum 1 is rotatable about a central axis X extending in an axial direction A. The tire building drum 1 is expandable in a radial direction R perpendicular to the central axis X. In FIGS. 2 and 3, only one of the drum halves and only the part of said drum half above the central axis X is shown. However, it will be clear that the tire building drum 1 extends in a circumferential direction C about the central axis X, as shown in FIG. 1.

The tire building drum 1 can be used for single-stage tire building, i.e. a tire building method in which one or more tire components 9, in particular one or more plies 90 and a bead 91, are build, assembled and/or shaped on the same tire building drum.

For this purpose, the tire building drum 1 comprises a crown section 3 for shaping the one or more plies 90 and a bead-lock section 4 for retaining a bead 91 to the one or more plies 90 at a bead-lock position B, as shown in FIG. 3. The tire building drum 1 further comprises a sleeve 6 for reducing imprints on the one or more tire components 9 as a result of the spacing between the crown segments 30 in the circumferential direction C In this exemplary embodiment, the tire building drum 1 further comprises a turn-up section 8, known per se, for turning up a part of the one or more plies 90 around the bead 91 against the shaped part of the one or more plies 90 at the crown section 3. The bead-lock section 4 is located at a side of or adjacent to the crown section 3 in the axial direction A. The turn-up section 8 is located in the axial direction A at a side of the bead-lock section 4 facing away from the crown section 3.

As best seen in FIG. 2, the tire building drum comprises a base 10 for supporting parts of the crown section 3, the bead-lock section 4 and/or the turn-up section 8. In this exemplary embodiment, the base 10 forms an intermediate member M that extends between the crown section 3 and the bead-lock section 4 in the axial direction A. The base 10 is further provided with a run-on surface 11 at the intermediate member M for guiding parts of the crown section 3 in a manner that will be described in more detail hereafter. The run-on surface 11 faces the crown section 3. The base 10 is arranged to be fitted concentrically to the drum shaft 2, as shown in FIG. 1, extending in the axial direction A at the central axis X.

The bead-lock section 4 comprises a plurality of bead-lock segments 40 which are movable in the radial direction R to engage and/or release the bead 91.

The crown section 3 comprises a plurality of crown segments 30 distributed in a circumferential direction C about the central axis X. The crown segments 30 are movable with respect to the base 10 from a crown-down position, as shown in FIG. 2, into a crown-up position, as shown in FIG. 3. The movement of the crown segments 30 between the crown-down position and the crown-up position is a movement in a crown-up direction D with at least a vector-component in the radial direction R. In this exemplary embodiment, the crown-up direction D is offset with respect to the radial direction R at a sharp oblique angle. Alternatively, the crown-up direction D may be closer to or even parallel to the radial direction R. Preferably, the movement in the crown-up direction D is a linear movement.

As shown in FIGS. 2 and 3, each crown segment 30 comprises an outer surface 31 that faces outwards in the radial direction R to support the one or more tire components 9. Preferably, the outer surface 31 extends parallel or substantially parallel to the axial direction A. Together, the outer surfaces 31 of the plurality of crown segments 30 form a crown surface P extending in the circumferential direction C to indirectly support the carcass 9 at the crown section 3 during the shaping of said one or more plies 90. Preferably, the crown surface P is a cylindrical or straight cylindrical surface. The crown surface P extends at a crown-down radius R1 when the crown segments 30 are in the crown-down position of FIG. 2 and at a crown-up radius R2, greater than the crown-down radius R1, when the crown segments 30 are in the crown-up position of FIG. 3.

The crown segments 30 together form a leading edge E of the crown section 3. The leading edge E is 'leading' in the sense that it is formed by the ends of the crown segment 30 that faces in and/or protrudes most forward in the axial direction A towards the run-on surface 11 and/or the bead-lock section 4 when the crown segment 30 is in the crown-down position, as shown in FIG. 2.

The crown segments 30 together form a shoulder S that defines, at least partially, the transition from the crown surface P to the leading edge E of the crown segments 30.

As shown in FIGS. 2 and 3, the crown segment 30 further comprises a slide surface 32 that extends parallel to the crown-up direction D. The run-on surface 11 of the base 10 faces the slide surface 32 of the crown segment 30 and extends at the same crown-up direction D. The run-on surface 11 terminates in a top end 12 at the crown-down radius R1. The crown segment 30 is arranged to slide in the crown-up direction D over the run-on surface 11 of the intermediate member M from the crown-down position into the crown-up position. The shoulder S extends between the outer surface 31 and the slide surface 32 of each crown segment 30. In this example, the shoulder S is rounded between the outer surface 31 and the slide surface 32 to form a smooth transition between the respective surfaces 31, 32. In particular, the rounded shoulder S provides a smooth transition from the outer surface 31 extending in the axial direction A to the slide surface 32 extending in the crown-up direction D. In this exemplary embodiment, the shoulder S is completely rounded.

Alternatively, the shoulder S may be at least partially rounded, i.e. with one or more non-circular features.

When the crown segments 30 are moved in the crown-up direction D from the crown-down position towards and/or into the crown-up position, the shoulder S is expanded in diameter. The one or more plies 90 is shaped around the should S. In particular, the shoulder S defines the transition between a radial side of the shaped one or more plies 90 and a circumferential tread of the one or more plies 90. The roundness of the shoulder S prevents that the crown segments 30 damage the one or more plies 90 during the shaping, in particular in the crown-up position.

As shown in FIG. 2, the sleeve 6 comprises a first circumferential edge 61, a second circumferential edge 62 opposite to the first circumferential edge 61 and a sleeve body 60 extending in a longitudinal direction L between the first circumferential edge 61 and the second circumferential edge 62. The longitudinal direction L is parallel or substantially parallel to the axial direction A when the crown segments 30 are in the crown-down position of FIG. 2. However, when the crown segments 30 are in the crown-up position of FIG. 3, the longitudinal direction L of the sleeve body 60 is different for different positions along the length of said sleeve body 60. The sleeve body 60 comprises a first section 63 that defines or is connected to the first circumferential edge 61 and a second section between the first section 63 and the second circumferential edge 62. The first section 63 is supported on the crown surface P of the crown segments 30 in both the crown-down position of FIG. 2 and the crown-up position of FIG. 3. In contrast, the second section 64 is the part of the sleeve body 60 that is unsupported with respect to the crown segments 30 when said crown segments 30 are in the crown-down position of FIG. 2. The second section 64 is however at least partially support by the crown segments 30, in particular by the shoulder S thereof, when said crown segments 30 are in the crown-up position of FIG. 3. In said crown-up position, the second section 64 preferably extends up to the leading edge E of the crown segments 30.

The first circumferential edge 61 of the sleeve 6 is fixed to the crown section 3 while the other circumferential edge 62 is arranged to be unfixed, unconstrained or free at least when the plurality of crown segments 30 are in the crown-down position of FIG. 2. In other words, the first circumferential edge 61 remains fixed to the crown segments 30 during the movement of the crown segments 30 from the crown-down position to the crown-up position and can be only be removed by partially disassembling the tire building drum with appropriate tools, while the circumferential edge 62 is unfixed, may move freely or is loose relative to the rest of the tire building drum 1, including the crown segments 30, in at least one direction in response to the movement of said crown segments, within the constraints of defined by the tire components 9, when applied to said tire building drum 1.

The first circumferential edge 61 is preferably fixed to the crown segments 30 at or in the crown surface P. A step may be provided in the crown segments 30 corresponding to the thickness of the sleeve 6 to recess the sleeve 6 with respect to the rest of the crown segments 30 outside of the sleeve 6. Alternatively, the first circumferential edge 61 may be fixed to the crown segments 30 at a position at a side of the crown segments 30 facing away from the bead-lock section 4 in the axial direction A.

In this particular example, the first circumferential edge 61 is fixed to the plurality of crown segments 30 at a side of the shoulder S opposite to or facing away from the bead-lock section 4 in the axial direction A. The second circumferential edge 62 is located on the opposite side of said shoulder S, in particular in the area between said shoulder S and the bead-lock position B. The second circumferential edge 62 preferably does not extend beyond said bead-lock position B in the axial direction A to prevent that the second circumferential edge or a part of the sleeve body 60 is locked-in and/or retained to the bead-lock section 4 when the bead 91 is being engaged. In other words, the second circumferential edge 62 should preferably be located in the axial direction A on the side of the bead-lock position B or the actual bead 91 that faces the crown section 3.

In the crown-down position of FIG. 2, the second circumferential edge 62 is arranged to rest on the intermediate member M, in particular on the top end 12 of the intermediate member M. Hence, the second circumferential edge 62 can be supported on the intermediate member M at substantially the same crown-down radius R1 as the crown surface P. More in particular, at least a part of the second section 64 may be supported on the intermediate member M or an extension thereof, to prevent slacking of said second section 64 in any gap between the crown segments 30 and the intermediate member M. Consequently, the second section 64 can be supported in a substantially level orientation and/or an orientation parallel to the axial direction A. In said orientation, the second section 64 can lie flush or substantially flush with the first section 63 and/or the crown segments 30 to provide a flat of substantially flat application surface for applying and/or stitching the tire components 9 on the tire building drum 1.

Preferably, in the crown-up position of FIG. 3, the sleeve 6 is solely supported by the crown segments 30 when the crown segments 30 are in the crown-up position. In other words, the sleeve 6 is spaced apart from the bead-lock section 4 and/or the intermediate member M when the crown segments 30 are in the crown-up position.

A method for tire building with the use of the aforementioned tire building drum 1 will be elucidated below with reference to FIGS. 1, 2 and 3.

The method comprises the steps of:
- moving the plurality of crown segments 30 into the crown-down position to receive one or more plies 90 onto the sleeve 6 at the crown section 3 and a bead 91 onto the bead-lock section 4 at the bead-lock position B;
- engaging the bead 91 with the bead-lock section 4 at the bead-lock position B; and
- moving the plurality of crown segments 30 from the crown-down position into the crown-up position to shape the one or more plies 90.

During the aforementioned steps, the second circumferential edge 62 is allowed to move freely with respect to the plurality of crown segments 30 in response to the movement of said plurality of crown segments 30 from the crown-down position into the crown-up position. The sections 63, 64 of the sleeve body 60 are supported in the manner as previously described, depending on the crown-down position or the crown-up position.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

Figure 4:
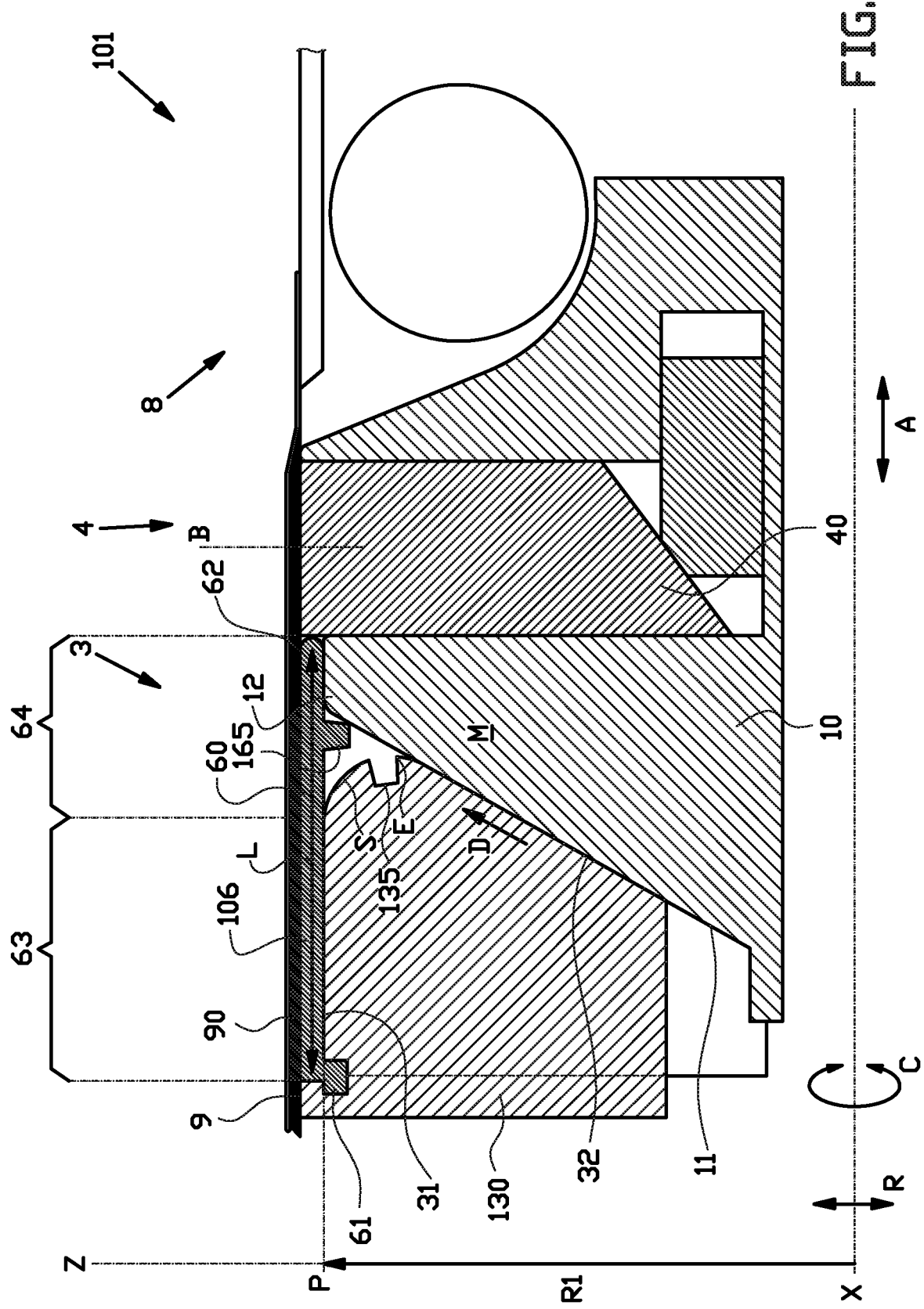
FIG. 4 shows a partial cross section of an alternative tire building drum according to a second embodiment of the invention.
Figure 5:
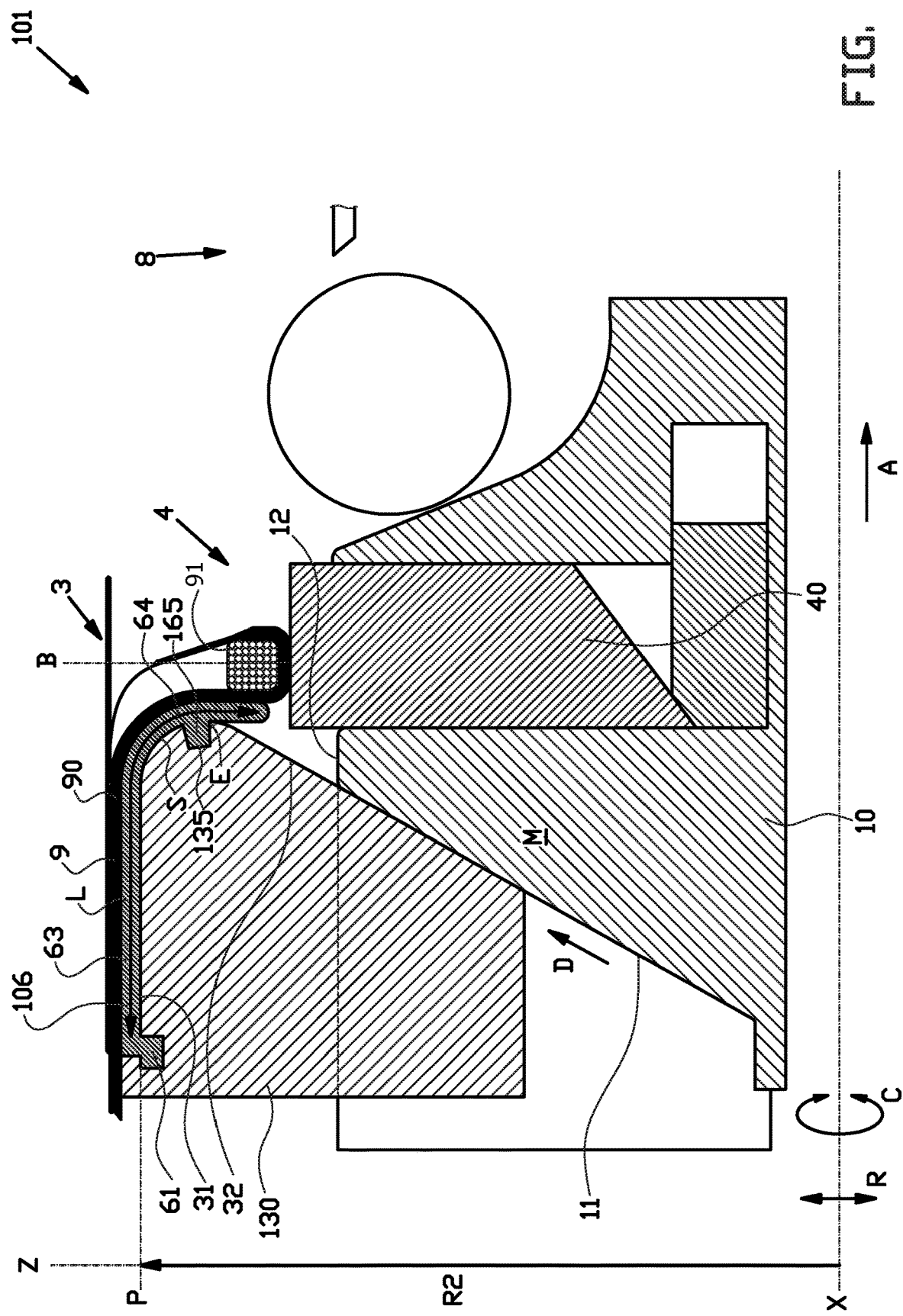
FIG. 5 shows a partial cross section of the alternative tire building drum according to FIG. 4, with the plurality of crown segments in a crown-up position.

For example, FIGS. 4 and 5 show an alternative tire building drum 101 according to an exemplary second embodiment of the invention, which differs from the tire building drum 1 according to FIGS. 1-3 in that it features an alternative sleeve 106 and a plurality of alternative crown segments 130. The alternative sleeve 106 is provided with a retaining element 165 in the second section 64 of the sleeve body 60. Said retaining element 165 is preferably located at or near the second circumferential edge 62. The retaining element 165 may be a continuous annular element extending in the circumferential direction C about the central axis X on the radial inside of the alternative sleeve 106. In this exemplary embodiment, the retaining element 165 is shaped as a protrusion. Said protrusion protrudes from the sleeve body in a direction transverse or perpendicular to the longitudinal direction L towards the shoulder S.

The retaining element 165 is arranged to be spaced apart and/or disengaged from the alternative crown segments 130 when the crown segments 130 are in the crown-down position, as shown in FIG. 4. In other words, the retaining element 165 is unfixed, free, unconstrained or loose, just like the second section 64 and/or the second circumferential edge 62.

However, as shown in FIG. 5, when the alternative crown segments 130 are moved from the crown-down position into the crown-up position, the retaining element 165 is arranged to engage and retain the alternative sleeve 106 to the plurality of alternative crown segments 130 in the longitudinal direction L of the sleeve body 60.

As best seen in FIG. 4, the plurality of alternative crown segments 130 each comprise a recess 135 for receiving the retaining element 165 when the plurality of alternative crown segments 130 are in the crown-up position. Hence, the retaining element 165 can engage and disengage the recess 135 in response to the movement of the alternative crown segments 130 between the crown-down position and the crown-up position through a simple form fit. Note that even when the retaining element 165 engages the alternative crown segments 130, the second circumferential edge 62 can still be considered unfixed, as the retaining element 165 can be automatically disengaged from the alternative crown segments 130 when the alternative crown segments 130 move back towards the crown-down position.

In summary, the invention relates to a tire building drum and a method for building a tire, wherein the tire building drum comprises a crown section and a bead-lock section, wherein the bead-lock section defines a bead-lock position, wherein the crown section comprises crown segments movable with respect to the base from a crown-down position into a crown-up position in a crown-up direction, wherein the crown segments together form a crown surface, a leading edge and a shoulder, wherein the tire building drum further comprises a sleeve that extends around the crown segments in the circumferential direction, wherein the sleeve comprises a first circumferential edge that is fixed to the crown segments at a side of the shoulder facing away from the bead-lock section, a second circumferential edge that is located between the shoulder and the bead-lock position, wherein the second circumferential edge is unfixed at least when the crown segments are in the crown-down position.

LIST OF REFERENCE NUMERALS

1 tire building drum
10 base
11 run-on surface
12 top end
2 drum shaft
3 crown section
30 crown segment
31 outer surface
32 slide surface
4 bead-lock section
40 bead-lock segment
6 sleeve
60 sleeve body
61 first circumferential edge
62 second circumferential edge
63 first section
64 second section
8 turn-up section
9 one or more tire components
90 one or more plies
91 bead
101 alternative tire building drum
130 alternative crown segment
135 recess
106 alternative sleeve
165 retaining element
A axial direction
B bead-lock position
C circumferential direction
D crown-up direction
E leading edge
L longitudinal direction
M intermediate member
P crown surface
R radial direction
R1 crown-down radius
R2 crown-up radius
S shoulder
X central axis
Z center of the tire building drum

The invention claimed is:

1. A tire building drum that is rotatable about a central axis extending in an axial direction, wherein the tire building drum comprises a crown section and a bead-lock section adjacent to the crown section in the axial direction, wherein the bead-lock section defines a bead-lock position for engaging a bead of a tire, wherein the crown section comprises a plurality of crown segments distributed in a circumferential direction about the central axis and movable with respect to the central axis from a crown-down position into a crown-up position in a crown-up direction with at least a vector-component in a radial direction perpendicular to the central axis, wherein the crown segments together form a crown surface facing outwards in the radial direction, a leading edge facing towards the bead-lock section in the axial direction when the crown segments are in the crown-down position and a shoulder that defines the transition from the crown surface to the leading edge, wherein the tire building drum further comprises a sleeve that extends around the plurality of crown segments in the circumferential direction, wherein the sleeve comprises a first circumferential edge that is fixed to the plurality of crown segments at a side of the shoulder facing away from the bead-lock section and a second circumferential edge that is located between the shoulder and the bead-lock position when said plurality of crown segments are in the crown-down position, wherein the second circumferential edge is unfixed at least when the plurality of crown segments are in the crown-down position.

2. The tire building drum according to claim 1, wherein the bead-lock section comprises a plurality of bead-lock segments which are movable in the radial direction for engaging the bead at the bead-lock position, wherein the second circumferential edge is located between the shoulder and the bead-lock segments when said plurality of crown segments are in the crown-down position.

3. The tire building drum according to claim 1, wherein the sleeve comprises a sleeve body extending between the first circumferential edge and the second circumferential edge, wherein the sleeve body comprises a first section that defines the first circumferential edge and that is supported on the plurality of crown segments in both the crown-down position and the crown-up position, wherein the sleeve body further comprises a second section extending between the first section and the second circumferential edge, wherein the second section is unsupported with respect to the plurality of crown segments in the crown-down position and at least partially supported by the shoulder in the crown-up position.

4. The tire building drum according to claim 3, wherein the tire building drum comprises an intermediate member between the crown section and the bead-lock section, wherein the second circumferential edge is supported on said intermediate member when the plurality of crown segments are in the crown-down position.

5. The tire building drum according to claim 4, wherein the second section is at least partially supported on said intermediate member when the plurality of crown segments are in the crown-down position.

6. The tire building drum according to claim 4, wherein the crown surface extends at a crown-down radius when the plurality of crown segments are in the crown-down position, wherein the intermediate member is arranged for supporting the second circumferential edge at the crown-down radius.

7. The tire building drum according to claim 3, wherein the second section is arranged to be supported on the shoulder at least up to the leading edge.

8. The tire building drum according to claim 3, wherein the sleeve body extends in a longitudinal direction from the first circumferential edge to the second circumferential edge, wherein the sleeve further comprises a retaining element in the second section which is disengaged from the plurality of crown segments when said crown segments are in the crown-down position and which is arranged to retain the sleeve to the plurality of crown segments in the longitudinal direction of the sleeve body when said crown segments are in the crown-up position.

9. The tire building drum according to claim 8, wherein the retaining element is a protrusion, wherein the plurality of crown segments each comprise a recess for receiving said protrusion when the plurality of crown segments are in the crown-up position.

10. The tire building drum according to claim 1, wherein the entire sleeve except for the first circumferential edge is unfixed when the plurality of crown segments are in the crown-down position.

11. The tire building drum according to claim 1, wherein the first circumferential edge is fixed to the plurality of crown segments at the crown surface.

12. A method for tire building with the use of a tire building drum according to claim 1, wherein the method comprises the steps of:

moving the plurality of crown segments into the crown-down position to receive one or more plies onto the sleeve at the crown section and a bead onto the bead-lock section at the bead-lock position;

engaging the bead with the bead-lock section at the bead-lock position; and moving the plurality of crown segments from the crown-down position into the crown-up position to shape the one or more plies;

wherein the second circumferential edge is allowed to move freely with respect to the plurality of crown segments in response to the movement of said plurality of crown segments from the crown-down position into the crown-up position.

13. The method according to claim 12, wherein the sleeve comprises a sleeve body extending between the first circumferential edge and the second circumferential edge, wherein the sleeve body comprises a first section that defines the first circumferential edge and that is supported on the plurality of crown segments in both the crown-down position and the crown-up position, wherein the sleeve body further comprises a second section extending between the first section and the second circumferential edge, wherein the method comprises the step of leaving the second section unsupported with respect to the plurality of crown segments in the crown-down position, while the second section is at least partially supported by the shoulder in the crown-up position.

14. The method according to claim 13, wherein the crown surface extends at a crown-down radius when the plurality of crown segments are in the crown-down position, wherein the method comprises the step of supporting the second circumferential edge at the crown-down radius when the plurality of crown segments are in the crown-down position.

15. The method according to claim 13, wherein the sleeve body extends in a longitudinal direction from the first circumferential edge to the second circumferential edge, wherein the sleeve further comprises a retaining element in the second section which is disengaged from the plurality of crown segments when said crown segments are in the crown-down position and which retains the sleeve to the plurality of crown segments in the longitudinal direction of the sleeve body when said crown segments are in the crown-up position.

* * * * *